United States Patent Office 3,308,883
Patented Mar. 14, 1967

3,308,883
THICKENED WATER FOR SECONDARY
RECOVERY PROCESS
William R. Foster, Dallas, Tex., assignor to Mobil Oil
Corporation, a corporation of New York
No Drawing. Filed Nov. 5, 1964, Ser. No. 409,318
6 Claims. (Cl. 166—9)

The present invention is broadly concerned with a secondary recovery operation for obtaining oil from a subterranean formation. The invention is more particularly directed to a secondary recovery operation wherein water is employed and wherein a water-thickening agent is utilized to increase the viscosity of the water so as to prevent fingering in the oil-containing formation.

The oil accumulated in subterranean formations is recovered or produced therefrom through wells drilled into the subterranean formations. A large amount of oil is left in the subterranean formations if produced only by primary depletion, i.e., by employing only initial formation energy to recover the oil. Supplemental operations, often referred to as secondary recovery operations, are used to improve the extent of recovery. In certain of these supplemental operations, a fluid is injected into a well, called an injection well, and passed into the formation. Oil is displaced within and is moved through the formation, and is produced from one or more other wells, called production wells, as the injected fluid passes from the injection well toward the production wells. In a particular recovery operation of this sort, water is employed as the injected fluid and the operation is referred to as a waterflood. The injected water is referred to as the flooding water, as distinguished from the in-situ or connate water.

While conventional waterflooding is effective in obtaining additional oil from oil-containing subterranean formations, it has a number of shortcomings. Foremost among these shortcomings is a tendency of flooding water to "finger" through an oil-containing formation and to bypass substantial portions thereof. By fingering is meant the developing of unstable bulges or stringers which advance toward the production wells more rapidly than the remainder of the flooding water. Furthermore, the water does not normally displace as much oil in the portions of the formation which it contacts as it theoretically is capable of doing.

It has been established that waterfloods perform less satisfactorily with viscous oils than with relatively non-viscous oils. The fingering and bypassing tendencies of the water are more or less directly related to the ratio of the viscosity of the oil to the viscosity of the floodwater. The viscosity of these oils varies from as low as 1 or 2 centipoises to 1,000 centipoises or higher. Water generally has a viscosity of about 1 centipoise.

The relationship between the mobility of the oil and the mobility of the flooding water in a particular formation is related to their respective viscosities according to the following equation:

$$\frac{M_o}{M_w} = \left(\frac{\mu_w}{\mu_o}\right)\left(\frac{K_o}{K_w}\right) \quad (1)$$

where $M_o$ is the mobility of the oil in the formation,
$M_w$ is the mobility of the flooding water in the formation,
$\mu_o$ is the viscosity of the oil,
$\mu_w$ is the viscosity of the flooding water,
$K_w$ is the relative permeability of the formation to the flooding water in the presence of the oil which remains after passage of the water, and
$K_o$ is the relative permeability of the formation to the oil in the presence of the connate water.

In a subterranean formation containing oil having a high viscosity, in order to achieve a mobility ratio of 1, i.e., where the flooding water has the same mobility as the oil in the formation, the viscosity of the flooding water must be increased.

Past suggestions for increasing the viscosity of flooding water have included incorporating water-soluble agents in the water. Materials that have been suggested for this purpose include a wide variety of naturally occurring gums, sugars, and polymers. While these materials are effective to an extent in increasing the viscosity of floodwater, they also are characterized by serious disadvantages. For example, some of the materials have a tendency to filter out and plug formation; some are relatively unstable and particularly subject to bacterial degradation; and some form insoluble precipitates with divalent ions native to the in-situ fluids, for example, calcium ion.

Accordingly, it is an object of this invention to provide a method of recovering oil from a subterranean formation wherein a marked increase in the viscosity of the flooding water is readily attained using stable, synthetic polymers which are not subject to bacterial degradation.

It is another object of the invention to provide a method of waterflooding an oil-containing subterranean formation with a viscous aqueous solution which is not susceptible to precipitation of an insoluble salt through reaction with the ions existing in the in-situ subterranean formation liquids.

It is another object of the invention to provide a method of waterflooding an oil-containing subterranean formation with a viscous aqueous solution containing a solute which will not filter out or plug the subterranean formation.

Further objects and attendant advantages of the invention will be apparent from the following description.

In accordance with the invention, in the recovery of oil from an oil-containing subterranean formation wherein a flooding liquid is injected through an injection well and oil is produced through a production well, there is employed, as the flooding liquid, water incorporating from 0.01 to 1.0 percent by weight of a sulfonated poly-(2,6-dialkyl phenol), or its water-soluble salts.

The structural formula of the sulfonated poly-(2,6-dialkyl phenol) is as follows:

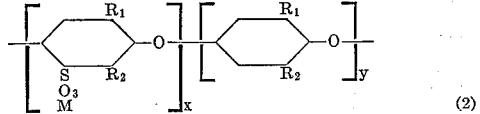

(2)

In this formula, $R_1$ and $R_2$ are alkyl groups containing 1 to 3 carbon atoms, inclusive, in a straight chain, namely, a methyl group, an ethyl group, or a normal propyl group. The two alkyl groups are in the two and six positions, on the phenol nucleus, while the sulfonate group is in the three position on the phenol nucleus. M is a cation and can be hydrogen, ammonium, or any metal which will replace hydrogen and produce a water-soluble polymer, e.g., lithium, sodium, potassium, rubidium, cesium, calcium, strontium, barium, or magnesium. Further, in the formula, $x$ is the number of sulfonated dialkyl phenol monomer units in the polymer, and $y$ is the number of unsulfonated dialkyl phenol monomer units in the polymer. The degree of sulfonation is defined as the fraction $$\frac{x}{x+y}$$

and is discussed hereinafter.

The water-soluble sulfonated poly-(2,6-dialkyl phenol) is prepared by a procedure in which, as a first step, the dialkyl phenol monomer is polymerized. In this first step, pyridine is added to a suitable solvent for the dialkyl phenol monomer. Suitable solvents include benzene and nitrobenzene. The pyridine acts as a ligand in the polymerization reaction. Cuprous chloride is also added to the solvent. These materials may be employed in the proportion of 90 milliliters of pyridine, 300 milliliters of solvent, and 0.4 gram of cuprous chloride. An oxygen-containing gas is then bubbled through the mixture to convert the cuprous chloride to cupric chloride. The cupric chloride reacts with the pyridine to form a complex which acts as a catalyst for the polymerization reaction. Thereafter, the monomeric 2,6-dialkyl phenol is added to the solution. The monomer may be added in the proportion of about 10 grams to a solution having the composition given above. The oxygen-containing gas is again passed through the reaction mixture to effect polymerization by oxidative coupling of the monomer. Passage of oxygen is continued until the desired degree of polymerization is effected.

After the desired degree of polymerization is effected, the polymerization reaction is terminated by discontinuing the supply of oxygen-containing gas to the reaction mixture. The pyridine is then removed from the reaction mixture. Removal may be carried out by distilling the pyridine from the reaction mixture. Alternatively, the pyridine can be removed by precipitation in the form of pyridine sulfate by adding sulfuric acid to the reaction mixture.

The polymerization of the 2,6-dialkyl phenol monomer can be carried out to effect, within limits, any desired degree of polymerization. For example, the polymerization can be carried out to effect polymerization such that the polymer contains about 1,500 or more monomer units. On the other hand, the polymerization can be carried out to produce a polymer having a lower molecular weight. For example, polymerization can be carried out such that the polymer contains from about 100 to about 1,000 monomer units.

The degree of polymerization can be controlled by control of the concentration of various of the components added to the reaction mixture. Control of the concentration of the cuprous chloride will control the degree of polymerization. For example, increasing the concentration of cuprous chloride will effect an increase in the molecular weight of the polymer. Additionally, the degree of polymerization can be controlled by control of the amount of the monomer added to the reaction mixture. Further, increase in the ratio of the amount of ligand, namely, the pyridine, to the amount of monomer added to the reaction mixture increases the degree of polymerization.

The degree of polymerization is not affected to any great extent by the type of oxygen-containing gas employed. It has been theorized that the polymerization of the monomer is brought about by an oxidative coupling. Regardless of the theory, oxygen must be present in the reaction mixture during the polymerization reaction. The oxygen maintains the copper chloride in the cupric form, as mentioned before, and in accordance with the theory, effects the oxidative coupling. The oxygen-containing gas employed may consist entirely of oxygen. However, the oxygen-containing gas may be air.

Sulfonation of the polymer can be effected following removal of the pyridine from the reaction mixture. Sulfonation is carried out by adding a sulfonating agent to the reaction mixture. In carrying out the sulfonation reaction, any of the known sulfonating agents may be employed. For example, the reaction may be carried out by employing sulfuric acid, fuming sulfuric acid (oleum), chlorosulfonic acid, or sulfur trioxide. Preferably, chlorosulfonic acid is employed.

The sulfonation reaction proceeds until such time that the sulfonated polymer precipitates from the reaction mixture. Stated otherwise, precipitation of the sulfonated polymer terminates the sulfonation reaction. Thus, the sulfonated product will ordinarily be uniform under any given set of reaction conditions. Further, sulfonation leads to a product which is readily water-soluble when cross-linking of the polymer does not occur to any great extent. Cross-linking is the reaction of the water-solubilizing sulfonate group to form a sulfone linkage between polymer chains, thus decreasing water solubility of the product.

The sulfonation reaction may be carried out at room temperature or may be carried out at lower temperatures. Thus, the reaction may be carried out at temperatures of about 25° C. or may be carried out at temperatures as low as as about 0° C.

Satisfactory sulfonation is effected by carrying out the reaction at atmospheric pressure. Sulfonation may also be effected at higher or lower pressures.

The time during which the sulfonation reaction is carried out is not of importance. As stated hereinabove, the reaction continues until such time that the sulfonated polymer precipitates. At this stage, the reaction terminates automatically.

The degree to which the polymer is sulfonated is susceptible to control. Sulfonation may be effected to obtain a degree of sulfonation of 1.0. Stated otherwise, the sulfonation can be controlled such that each unit of monomer in the polymer contains one sulfonic acid radical, i.e., ($-SO_3H$). The sulfonation may also be effected to obtain a degree of sulfonation less than 1.0. It is preferred that the degree of sulfonation be at least 0.2 in order to assure water solubility. Also, it is preferred that the degress of sulfonation be no greater than about 0.67, since cross-linking becomes a problem when higher degrees of sulfonation are employed. Generally, the degree of sulfonation is controlled by proportioning the amount of sulfonating agent with respect to the amount of polymer in the reaction mixture. Thus, higher degrees of sulfonation are obtained by increasing the ratio of the amount of sulfonating agent to the amount of poly-(2,6-diakyl phenol) in the reaction mixture. On the other hand, the reaction is not stoichiometric and, accordingly, the degree of sulfonation will not correspond precisely to the molecular ratio of sulfonating agent to that of polymer. Where the desired degree of sulfonation is about 0.6, satisfactory results are obtained employing twice the stoichiometric amount of sulfonating agent.

The acid form of sulfonated poly-(2,6-diakyl phenol) can be converted to any of various salts. Conversion can be effected by reacting the acid form of the polymer with a compound, such as a metallic hydroxide, containing as a cation a metal capable of replacing the hydrogen ion of the acid form. Thus, the acid form of the sulfonated polymer can be converted to an alkali metal salt, an alkaline earth metal salt, or an ammonium salt. Accordingly, the sulfonated polymer can be obtained in the form of its sodium, potassium, rubidium, cesium, lithium, calcium, strontium, barium, magnesium, or ammonium salts. From the standpoint of economy, the sodium salt is to be preferred to other alkali metal salts. Further, the calcium salt is to be preferred to other alkaline earth metal salts.

Hereinafter, for purposes of simplification of description, the term "sulfonated poly-(dialkyl phenol)" is employed to mean, unless otherwise qualified, the salts as well as the acid form of sulfonated poly-(2,6-diakyl phenol).

In the practice of the invention, the sulfonated poly-(dialkyl phenol) which is employed as an additive for flooding water may have a molecular weight of as low as about 10,000. Preferably, however, a higher molecular weight of the sulfonated polymer is employed. Thus, for example, it is preferred that the molecular weight be at least about 20,000. Satisfactory results are obtained when the molecular weight of polymer employed is between about 40,000 and about 100,000. Satisfactory results are also obtained when the molecular weight of the polymer is about 150,000. Higher molecular weights of the polymer may also be employed.

The water containing the sulfonated poly-(dialkyl phenol) may comprise the entire fluid which is injected during the secondary recovery operation. Alternatively, the water containing the polymer may be injected as a slug ahead of, intermittently with, or behind one or more other fluids being injected in a secondary recovery operation. For example, it may be injected in the form of one or more slugs during a waterflood, a miscible flood, or a gas drive.

The following table illustrates viscosities obtainable with aqueous solutions containing different concentrations of sulfonated poly-(dialkyl phenol).

| Additive | Additive Concentration in Weight Percent | Sodium Chloride Concentration in Weight Percent | Viscosity* in cps. at 3.3 sec.$^{-1}$ |
|---|---|---|---|
| H+SPDMP | 0.01 | | 1.6 |
| H+SPDMP | 0.025 | | 2.4 |
| H+SPDMP | 0.05 | | 3.4 |
| H+SPDMP | 0.1 | | 4.8 |
| H+SPDMP | 0.15 | | 5.2 |
| H+SPDMP | 0.3 | | 6.6 |
| H+SPDMP | 0.3 | 0.1 | 4.2 |
| Na+SPDMP | 0.5 | | 14.6 |
| Na+SPDMP | 0.5 | 0.1 | 7.6 |
| Na+SPDMP | 0.5 | 1.0 | 3.4 |

SPDMP—Sulfonated poly-(dimethyl phenol), having a molecular weight of about 40,000 and having a degree of sulfonation=0.6.
H+—acid form; Na+—sodium salt.
*As measured in a Couette-type device having a U.L. Adapter.

Having thus described the invention, it will be understood that such description has been given by way of illustration and example and not by way of limitation, reference for the latter purpose being had to the appended claims.

What is claimed is:

1. In a method for the recovery of oil from an oil-containing subterranean formation wherein a fluid is injected into an injection well penetrating said formation, the improvement comprising injecting through said injection well and into said formation a thickened aqueous solution comprising water having incorporated therein from 0.01 to 1.0 percent by weight of a water-soluble compound selected from the class consisting of sulfonated poly-(dialkyl phenol) and its salts wherein the alkyl groups are in the two and six positions on the phenol nucleus and are selected from the class consisting of methyl, ethyl, and normal propyl.

2. The method of claim 1 wherein said sulfonated poly-(dialkyl phenol) has a molecular weight of from about 10,000 to about 150,000.

3. The method of claim 2 wherein said sulfonated poly-(dialkyl phenol) has a molecular weight of from about 20,000 to about 100,000.

4. The method of claim 1 wherein said sulfonated poly-(dialkyl phenol) has a degree of sulfonation of from 0.2 to 0.67.

5. The method of claim 1 wherein said sulfonated poly-(dialkyl phenol) is sulfonated poly-(2,6-dimethyl phenol).

6. The method of claim 5 wherein said sulfonated poly-(2,6-dimethyl phenol) contains a cation selected from the group consisting of hydrogen, sodium, potassium, lithium, rubidium, cesium, calcium, barium, magnesium, strontium, and ammonium.

References Cited by the Examiner
UNITED STATES PATENTS

| | | | |
|---|---|---|---|
| 3,148,730 | 9/1964 | Holbert | 166—9 |
| 3,180,410 | 4/1965 | Turbak | 166—9 |
| 3,208,518 | 9/1965 | Patton | 166—9 |

References Cited by the Applicant
UNITED STATES PATENTS

| | | |
|---|---|---|
| 2,341,500 | 2/1944 | Detling. |
| 3,079,336 | 2/1963 | Stright et al. |
| 3,085,063 | 4/1963 | Turbak. |
| 3,087,539 | 4/1963 | Maurer. |
| 3,126,952 | 3/1964 | Jones. |

CHARLES E. O'CONNELL, *Primary Examiner.*

S. J. NOVOSAD, *Assistant Examiner.*